United States Patent
Kaag et al.

(10) Patent No.: US 11,611,478 B2
(45) Date of Patent: Mar. 21, 2023

(54) DISTRIBUTED CONFIGURATION MANAGEMENT IN APPLICATION CONTROL NETWORKS

(71) Applicant: SIGNIFY HOLDING B.V., Eindhoven (NL)

(72) Inventors: Bjorn Christiaan Wouter Kaag, Eindhoven (NL); Matthias Wendt, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 189 days.

(21) Appl. No.: 16/070,591

(22) PCT Filed: Jan. 24, 2017

(86) PCT No.: PCT/EP2017/051400
§ 371 (c)(1),
(2) Date: Jul. 17, 2018

(87) PCT Pub. No.: WO2017/129550
PCT Pub. Date: Aug. 3, 2017

(65) Prior Publication Data
US 2019/0020542 A1    Jan. 17, 2019

(30) Foreign Application Priority Data
Jan. 29, 2016    (EP) .................................... 16153309

(51) Int. Cl.
*H04L 41/0833*    (2022.01)
*H04L 12/10*    (2006.01)
(Continued)

(52) U.S. Cl.
CPC .......... *H04L 41/0833* (2013.01); *H04L 12/10* (2013.01); *H04L 41/0806* (2013.01);
(Continued)

(58) Field of Classification Search
CPC ............. H04L 12/2816; H04L 12/2803; H04L 12/2823; H04L 12/283; H04L 12/2838;
(Continued)

(56) References Cited

U.S. PATENT DOCUMENTS 6,834,208 B2 * 12/2004 Gonzales ............ H04L 12/2803
700/86
9,325,516 B2 * 4/2016 Pera ..................... H04L 12/2823
(Continued)

FOREIGN PATENT DOCUMENTS

| CN | 101645780 A | 2/2010 |
| CN | 103095505 A | 5/2013 |
| WO | WO2014050970 A1 | 4/2013 |

OTHER PUBLICATIONS

Matthias Wendt, et al., "LEDs in Real Lighting Applications: from Niche Markets to General Lighting", Conference Record of the 2006 IEEE Industry Applications Conference Forty-First IAS Annual Meeting, Dec. 11, 2006, pp. 1-3.

*Primary Examiner* — Glenton B Burgess
*Assistant Examiner* — Rachel J Hackenberg

(57) ABSTRACT

The invention relates to a device, system and method for controlling application components in an application control network (300) comprising at least a first network component (110, 180, 301) connected to a first data port of a first data forwarding device (102, 110, 180) of the application control network. A configuration profile for the at least one network component (110, 180, 301) is determined in accordance with an application plan comprising timing and interaction information of the application components within the application control network. The configuration profile is transmitted to a network component (102, 110, 180) communicatively close to the at least first network component, in particular the data forwarding device the first network component is attached to, for storage and for subsequent transmission to
(Continued)

the first network component (110, 180, 301) after the first network component (110, 180, 301, L1-L3) has been rebooted.

15 Claims, 7 Drawing Sheets

(51) Int. Cl.
    *H04L 41/0806* (2022.01)
    *H04L 67/10* (2022.01)
    *H04L 67/00* (2022.01)
    *H04L 67/1097* (2022.01)

(52) U.S. Cl.
    CPC .......... *H04L 67/10* (2013.01); *H04L 67/1097* (2013.01); *H04L 67/34* (2013.01)

(58) Field of Classification Search
    CPC ... H04L 67/125; H04L 67/10; H04L 67/1097; H04L 67/34; H04L 43/08; H04L 43/0811; H04L 43/0876; H04L 12/1877; H04L 12/4641; H04L 12/18; H04L 12/185; H04L 12/1886; H04L 12/413; H04L 12/46; H04L 12/4625; H04L 12/10; H04L 41/0631; H04L 41/0803; H04L 41/082; H04L 41/12; H04L 41/22; H04L 41/5045; H04L 41/5054; H04L 41/0806; H04L 41/0833; H04L 41/0866; H04L 41/0856; H04L 12/01; Y04S 40/18; G05B 2219/2613; G05B 2219/2642; G08G 1/00; G08G 1/02; G08G 1/07; G08G 1/095; G08G 1/096811; G08G 1/096844; G08G 1/133; G08G 1/163; G08G 1/166; G08G 1/205; H04W 84/18; H05B 47/18; H05B 47/105; H05B 47/175; H05B 47/185; H05B 47/19; G06F 1/266; G06F 1/26; G06F 1/3203; G06F 1/28; G06F 1/24; G06F 1/3206; G06F 1/3215; G06F 1/325; G06F 1/3287; Y10T 307/724; Y10T 307/391; Y10T 307/438; Y10T 307/469; H04B 3/54; H04M 1/72533; H02J 9/02

See application file for complete search history.

(56) References Cited

U.S. PATENT DOCUMENTS

| | | | |
|---|---|---|---|
| 9,544,976 B2* | 1/2017 | Snyder | H05B 47/19 |
| 2006/0253526 A1 | 11/2006 | Welch et al. | |
| 2007/0273307 A1* | 11/2007 | Westrick | H05B 47/16 |
| | | | 315/312 |
| 2008/0170511 A1* | 7/2008 | Shorty | H04L 29/06027 |
| | | | 370/254 |
| 2013/0159754 A1* | 6/2013 | Wendt | H04L 12/10 |
| | | | 713/330 |
| 2013/0249441 A1 | 9/2013 | Roosli | |
| 2014/0115354 A1* | 4/2014 | Jabbaz | H04L 12/10 |
| | | | 713/310 |
| 2014/0303840 A1 | 10/2014 | Diab | |
| 2015/0081127 A1* | 3/2015 | Bhageria | H02J 4/00 |
| | | | 700/295 |
| 2015/0100674 A1 | 4/2015 | Chiche et al. | |
| 2015/0256665 A1 | 9/2015 | Pera | |
| 2016/0195864 A1* | 7/2016 | Kim | H04L 12/2816 |
| | | | 709/221 |
| 2017/0026252 A1* | 1/2017 | Dearien | H04L 43/0829 |
| 2017/0097621 A1* | 4/2017 | Ackmann | G05B 19/0426 |

* cited by examiner

204 - application plan
210 - SDA system
231 - management system
200 - control system
180 - data forwarding device
110 - network boarder component
100 - communication network
301 - application control component
330 - energy storage
application control network

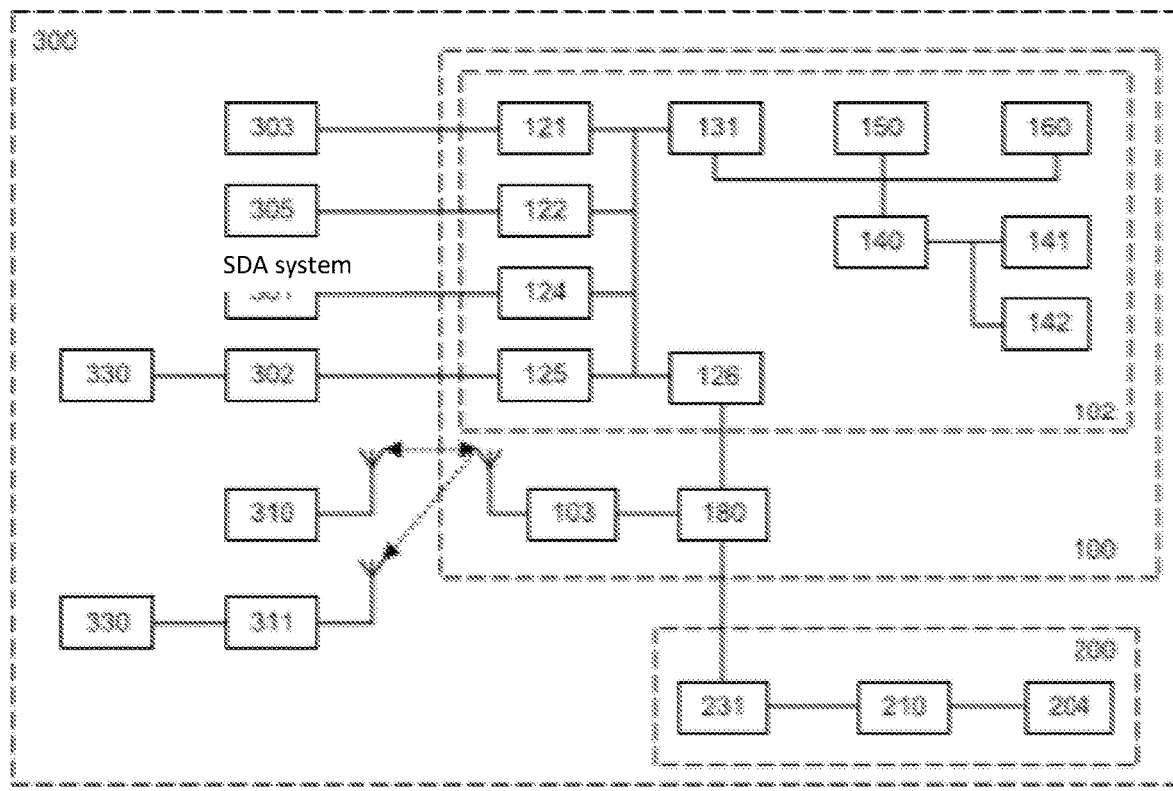

FIG. 7

100 - communication network
102 - data forwarding device
103 - wireless bridge
121 – data port
122 – data port
124 – data port
125 – data port
126 – data port
131 – data port management module
140 – microprocessor
141 – memory
142 - storage
150 – cache module
160 – event proxy module 180 – data forwarding device
200 – control system
204 - application plan
210 - SDA system
231 – network management system
300 – application control network
301 – application control component
302 - actuator
303 – application control component
305 - lamp
310 – end node
311- end node
330 - storage

DISTRIBUTED CONFIGURATION MANAGEMENT IN APPLICATION CONTROL NETWORKS

Cross-Reference to Prior Applications

This application is the U.S. National Phase application under 35 U.S.C. § 371 of International Application No. PCT/EP2017/051400, filed on Jan. 24, 2017, which claims the benefit of European Patent Application No. 16153309.6, filed on Jan. 29, 2016. These applications are hereby incorporated by reference herein.

FIELD OF THE INVENTION

The present invention relates to application control networks, in particular but not limited to lighting control networks with application control components communicatively coupled to data forwarding devices of a backbone communication network. In particular, the invention relates to distributed configuration management of the network components, application control component and data forwarding devices, especially after these components have been rebooted.

BACKGROUND OF THE INVENTION

In modern application control networks, such as—but not limited to—lighting control networks, network management systems control communication paths through the communication backbone network underlying the application control network. Application control component within these application control networks usually constitute end nodes connected to a data port of a network border component such as a data forwarding device, e.g. a data switch etc. The application control components may be controlled by a control system which is connected with the respective application control component via data paths along one or more data forwarding device, e.g. data switches, routers, gateways, etc.

In order to switch application control components, such as an actuator in a (lighting) application control network, data ports of the data forwarding devices that are connected to end nodes can be switched by the control system by transmission of the respective commands to the data forwarding device, provided the communication path in between the data forwarding device and the control system remains powered.

In order to improve the overall energy consumption of an application control network a Software Defined Control (SDC) system can analyze and determine operation schedules for the respective end node in accordance with the application requirements set out in an application plan. Based on such a schedule a data port on a data forwarding device may be switched off and, thus, the network interface and end node attached thereto will power down. The network interface does not need to remain powered to listen for wake up signals, since the schedule comprises information about the time the data forwarding device and any of its data ports need to be fully functional again. Scheduled power saving networks are in particular useful in terms of power savings, if the control system and the respective end nodes are separated by a long network path in between. Furthermore, two types of end nodes can be connected to such a data port: an end node powered by an external power source, for example by a battery, a power grid or a power generator or an end node powered by the data forwarding device, for example by PoE standard.

From US 2013/0159754 A1 an apparatus for powering an electrical consumer via a data connection is known, wherein the apparatus comprises a power supply for supplying power to the electrical consumer via the data connection, a data receiving unit for receiving data to be sent to the electrical consumer and a controller for activating the supply of power to the electrical consumer via the data connection, if data to be sent to the electrical consumer have been received and the supply of power to the electrical consumer is deactivated. Since the controller activates the supply of power to the electrical consumer, if data to be sent to the electrical consumer have been received and the supply of power to the electrical consumer is deactivated, the electrical consumer itself does not need to be supplied by power of the apparatus, in order to stay alert to be able to react on data connection activity.

When a data port of a data forwarding device is set to a low power state or power is shut down, the connected end node will subsequently power down and stop functioning. When power is restored, the connected end node is rebooted. Several problems occur in such control networks:

If the connected end node does not have local memory storage to remember its configuration before shut down, a fully functional and powered communication path through the communication network between a control system and the end node is required to reset the configuration parameters.

US 2006/0253526 A1 relates to configuration management for wireless networking systems across metropolitan-wide areas, wherein the system comprises intelligent network servers and intelligent network nodes. The intelligent network servers provide automated configuration management via code packages which are downloaded by each intelligent network node, when the network node is booted up. The intelligent network servers keep an up-to-date database of the entire network setup including device configurations, and therefore the corresponding code packages required. Code packages are remotely upgradable across the system.

A (re)-configuration procedure however causes undesired network traffic, occupies bandwidth and requires active data forwarding devices along the data path between control system and end node. In particular, for end nodes that are powered over Ethernet after reboot of the PoE end node, the power negotiation protocol between end node and data forwarding device may take 10 seconds or more. The time may vary between data ports and between different data forwarding device types. There is no requirement set out in the Ethernet standard IEEE Std 802.3-2012 to ask a data forwarding device, if the connected device is busy doing the PoE power negotiation protocol, request how long the PoE power negation will take nor detect any of the states the power negotiation protocol is in. The end node must be considered unavailable during this reboot phase.

SUMMARY OF THE INVENTION

It is thus an object of the present invention to provide an improved device, system and method for managing network component configurations, particularly after a reboot of such a component.

The object is achieved by a device, system and method according to the independent claims. Further, preferred embodiments are defined by the dependent claims.

In an aspect of the present invention there is provided a data forwarding device for controlling at least one network component within an application control network, wherein the network component is connected to a data port of the data forwarding device. The data forwarding device comprises a memory for storing a configuration profile set up in accordance with an application plan comprising timing and interaction information of application components within the application control network, a configuration cache module for transmitting the configuration profile to the network component after the network component has been rebooted.

By decentralizing the configuration profile management and provide local configuration profiles stored directly at the data forwarding device a network component is connected to, network traffic can be reduced and the network components between the data forwarding device and a central managing unit providing the initial configuration profiles may be set to a low power mode if appropriate to save energy. The network component may be an application component or a further data forwarding device connected to a port of the data forwarding device. Both may be set to a low power mode and require a reboot afterwards or need to be rebooted for other reasons. The memory for storing a configuration profile may be integrated into the data forwarding device or may be an external component, e.g. a retrofit component, connected to the data forwarding device, e.g. via a data port of the data forwarding device. Wherein the approach focuses on reestablishing configurations after reboot, a configuration profile may also be provided after initially booting an application control component, for instance when exchanging an old or even broken application control component with a new one of same type. In such a case the previous configuration profile could be used as a default configuration profile which may be refined during commissioning or operation of the new application control component.

In a preferred embodiment the data forwarding device further comprises a power metering means for measuring a power status of the data port the network component is connected to, after a reboot of the network component has been initiated, wherein the configuration cache module is configured to transmit the configuration profile to the network component when the measured power status of the data port is stable. The power metering means exploit the unstable power conditions during reboot to ensure that the configuration profile is not already being transmitted, although the network component is not yet able to receive it.

In a preferred embodiment the data forwarding device further comprises an analysis unit for determining a reboot time of the network component based on the time measured until the power status of the data port is stable after a reboot of the network component has been initiated. The data forwarding device may monitor the reboot time(s) based on the time required to have a stable power status at a data port after reboot.

In a preferred embodiment the configuration cache module configured to transmit the configuration profile after a reboot of the network component has been initiated and the reboot time expired. The calculated reboot time may be used as a transmission delay by the configuration cache module for transmitting the configuration profile to the network component.

In a preferred embodiment the configuration cache module is triggered to transmit the configuration profile after the data forwarding device has received a signal from a second network component connected to another data port of the data forwarding device. This approach refers to local triggering of the configuration profile transmission. For instance, if a sensor and an application control component are connected to the same data forwarding device, it may be reasonable to program that the data forwarding device may be programmed to recognize that the trigger event is meant for the application control component and instead of sending the trigger event to a (central) network control system (all along the way though the network) to initiate a reboot of the application control component and the subsequent reconfiguration, the data forwarding device may initiate the reboot directly and thus spare the traffic between network control system and application control component.

In a preferred embodiment the data forwarding device further comprises an event proxy module for simulating in accordance with a predetermined pattern a trigger event from a second network component connected to a data port of a second data forwarding device. In cases where a regular pattern can be determined for a trigger event requiring a certain reaction by an application control component, the pattern may be learned and programmed to the data forwarding device. The data forwarding device may then simulate the trigger event. Thus, in case the trigger is not directly connected to a port of the data forwarding device that is also connected to the application control component addressed by the trigger event, transmission of the trigger data may be spared and a network path in between may not be active to ensure proper operation of the application control system.

In an aspect of the present invention there is provided a system for controlling application control components in an application control network comprising at least a first network component connected to a first data port of a first data forwarding device of the application control network. The system comprises an analysis unit for determining a configuration profile for the at least first network component in accordance with an application plan comprising timing and interaction information of the application components within the application control network; and a transmission unit for transmitting the configuration profile to a network component communicatively close to the at least first network component for storage and for subsequent transmission to the at least first network component after the at least first network component has been rebooted.

By decentralizing the configuration profile management and provide local configuration profiles stored at a device communicatively close to the network component to be configured, network traffic can be reduced and the network components between the data forwarding device and a central managing unit providing the initial configuration profiles may be set to a low power mode if appropriate to save energy. The network component may be an application component or a further data forwarding device connected to a port of the data forwarding device. Both may be set to a low power mode and require e reboot afterwards or need to be rebooted for other reasons. The network component communicatively close to the first network component that is to receive the configuration profile may preferably be the data forwarding device the first network component is connected to. However, it may also be another network component along the network path between the data forwarding device the first network device is connected to and a network control system providing the configuration profiles.

In a preferred embodiment the at least first network component is an application control component (i) powered by an external power source or storage; or (ii) powered via the data port of the data forwarding device the application control component is attached to.

In a preferred embodiment the at least first network component is a further data forwarding device within the application control network. Instead of storing a configuration profile for an application control component, also a data forwarding device may be powered down or require a reboot due to other reasons. The decentralized configuration approach may thus be equally applied for data forwarding device, such as data switches, routers, gateway, etc.

In a preferred embodiment the analysis unit is further configured to monitor a reboot time of the at least first network component and align a transmission time delay for transmitting the configuration profile from the network component communicatively close to the first network component to the at least first network component with the reboot time.

In a preferred embodiment a second network component is connected to a second data port of the first data forwarding device and wherein the analysis unit is further configured to determine (i) a second configuration profile for the second network component or (ii) a common configuration profile for the first and second network component.

In a preferred embodiment the system further comprises a control unit for instructing a second data forwarding device along a communication path between the first data forwarding device and the control unit to power down for a predetermined time interval, after the configuration profile has been transmitted to the network component communicatively close to the first network component.

In an aspect of the present invention there is provided method for controlling application components in an application control network comprising at least a first network component connected to a first data port of a first data forwarding device of the application control network. The method comprises determining a configuration profile for the at least one network component in accordance with an application plan comprising timing and interaction information of the application components within the application control network; and transmitting the configuration profile to a network component communicatively close to the at least first network component for storage and for subsequent transmission to the at least first network component after the at least first network component has been rebooted.

In a preferred embodiment determining a configuration profile comprises monitoring a reboot time of the at least first network component and aligning a transmission time delay for transmitting the configuration profile from the network component to the at least first network component with the reboot time.

In an aspect of the present invention there is provided a computer program for controlling application components in an application control network comprising at least a first network component connected to a first data port of a first data forwarding device of the application control network, the computer program being executable in an processing unit, the computer program comprising program code means for causing the processing unit to carry out a method as defined in claim 13 or 14 when the computer program is executed in the processing unit.

It shall be understood that the data forwarding device of claim 1, the control system of claim 7, the method of claim 13 and the computer program for controlling application components in an application control network of claim 15 have similar and/or identical preferred embodiments, in particular, as defined in the dependent claims.

It shall be understood that a preferred embodiment of the present invention can also be any combination of the dependent claims or above embodiments with the respective independent claim.

These and other aspects of the invention will be apparent from and elucidated with reference to the embodiments described hereinafter.

BRIEF DESCRIPTION OF THE DRAWINGS

In the following drawings:

FIG. 7 shows a detailed system diagram according to a preferred embodiment of the present invention.

DETAILED DESCRIPTION OF EMBODIMENTS

Some embodiments are exemplary described in the context of lighting control applications as preferred embodiments. However, it is to be understood that the embodiments are not restricted to lighting control applications. The person skilled in the art will appreciate that the methods and systems may be exploited for any other application control network requiring a similar network topology.

In the following a software defined application (SDA) system provides knowledge about application specific requirements and instructions as stipulated in an application plan comprising one or more application scenes. For instance, an example of an SDA system is a software defined lighting (SDL) system that defines a lighting plan comprising one or more lighting scenes. A lighting scene may, for example, define dependencies or interactions between application control components, e.g. which lamps are to be switched on, if a particular sensor is triggered. The lighting scenes may be defined for specific timeslots, such as day or night, weekdays, weekends, and so on.

A network management system such as a software defined networking (SDN) system provides knowledge about the respective network components present in a mesh network constituting the backbone network of the application control network and may control configuration of forwarding tables and the like. However, the network management system does not know about application specific connections between certain network components.

Together the SDA system and the network management system constitute a software defined control (SDC) system which combines both layers (application and network). The SDC system maps the application/lighting components onto the network topology and, thus, has the knowledge to decide which network components or component parts may be switched off without degrading the capability of the (lighting) control network to execute a (lighting) application.

Figure 1:
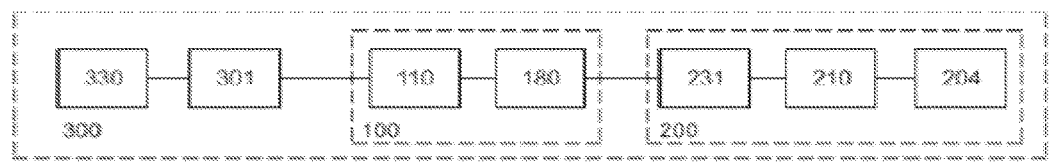
FIG. 1 shows a domain model of an application control system.
Figure 2A:
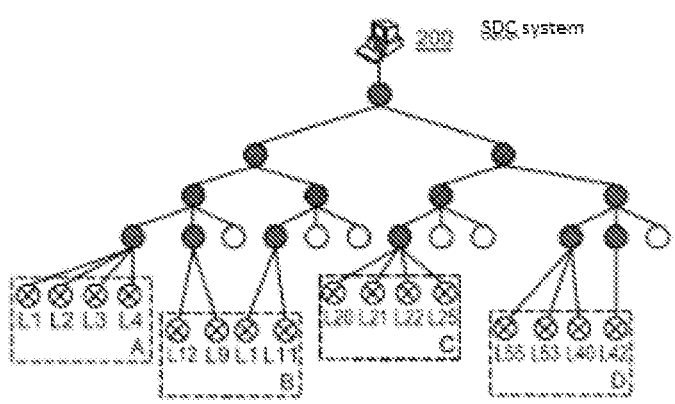
FIGS. 2a and 2b show a cascading network topology with required communication paths without and with a configuration system and data forwarding device according to a preferred embodiment of the present invention.
Figure 2B:
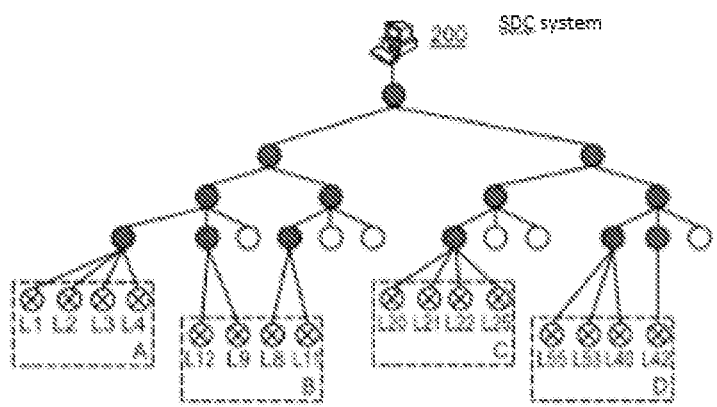

FIG. 1 illustrates a domain model of an application control network 300 as a preferred embodiment of the present invention. SDA system 210, managing application plan 204 and the application scenes stipulated therein, is comprised in SDC system 200 which can consult a network management system 231 and dynamically configure communication paths 180 through a communication network 100 to a data port of a border network component 110 that is connected to an application control component 301, such as a sensor end node. An (optional) energy source or energy storage 330 provides power to the sensor end node 301, if the border network component 110 does not provide power to the end node 301, e.g. via Power over Ethernet (PoE).

In a preferred embodiment of the present invention a cache per data port on a data forwarding device is configured to preload a configuration profile with commands for a network component, either an application control component or a further data forwarding device, attached to the respective port. Additionally, the exact transmission delay time for transmission of said commands may optionally be included in the configuration profile. The cache per data port may be implemented in a common data structure or with separate data structures per port.

Control system 200 is configured to analyze (light) application scene(s) comprised in an application plan to find collaborating actuators and sensors. These collaborating application control component are mapped onto the communication network to determine a data forwarding device and the data ports to which a respective application control component or data forwarding device is connected. The SDC may compute a configuration profile for each data port within the application control system by collecting required configuration commands and optional reboot times. The SDC system may then provide the configuration profiles to respective configuration caches on a data forwarding device with configuration commands and optional transmission delays for a network component, such as an application control component or another data forwarding device connected to the port. A data forwarding device does not need to know what it transmits to the application component or to a further data forwarding device connected to its data port(s). It will just transmit data from its preloaded configuration caches after a transmission delay has expired. This simplifies the design of the data forwarding device.

Figure 3:
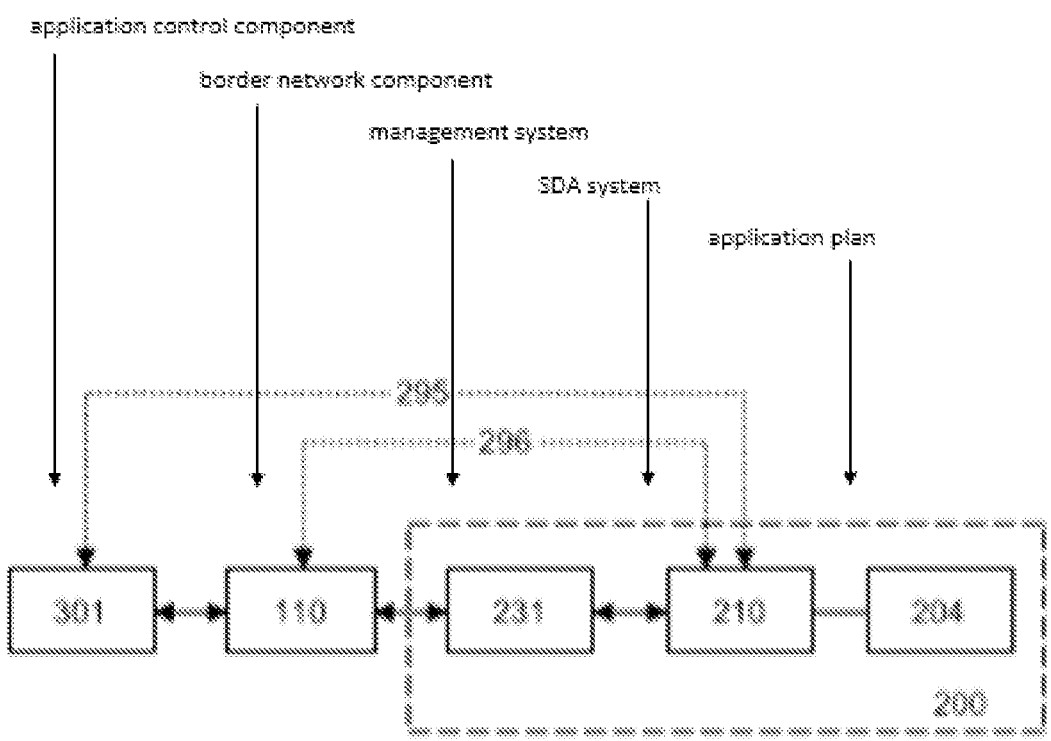
FIG. 3 shows a system diagram in accordance with a preferred embodiment of the present invention.

In the following, several preferred embodiments will be described with reference to FIGS. 3 and 4, wherein the same numbers in the drawing indicate the same functionality. The approach is described for an application control component 301 attached to a data port of a network boarder component 110, e.g. a data forwarding device. However, instead of an application control component 301 also another data forwarding device 180 may be attached to the data port and the following description applies in an analogue manner. The control system 200 dynamically configures each data port of a network border component 110 requiring a configuration via control line 296 as explained in the following. The control system 200, in particular, the SDA system 210 that may exchange data with management system 231 and has access to application plan 204, analyses the application scenes defined in the application plan to determine the interactions between application control components 301, the ID of the data forwarding device 110 and the data port the application control component is connected to as well as information, whether the application control component 301 is powered by the data forwarding device 110 or not. Based on at least parts of this information, the control system 200 may determine, whether a configuration profile is required.

The SDC system 200 determines, if an associated application control component 301 needs to be configured via control line 295 with commands or not and, if so, collects the one or more commands to enable the correct settings in said application control component after the connection between data forwarding device and application control component is (re-)established. In addition to reconfiguring an application control component for instance after reboot, a configuration profile may also be provided to a new or replaced application control component as an initial configuration, in particular when the new application control component is of the same type as the old application control component, e.g. during maintenance replacements. The previous configuration profile could be used as an initial configuration which may be refined during operation.

The SDC system may interrogate the data forwarding device about its capabilities to initialize a configuration cache on a required data port. If the data forwarding device reports such capability, the SDC system will command the data forwarding device to reserve a specified amount of memory corresponding to the size of the configuration profile.

If the power of a previously shut down application control component is being restored, the reboot time must be known to prevent transmission of the configuration commands from the configuration cache 150, before the connected application control component is stable A self-learning system may learn the reboot time of an application control component according to the current PoE standard the reboot time cannot be requested from PoE power supply equipment. In the preferred embodiment the SDA system may learn the PoE reboot time by observing the status of the application control component. The SDC system records the time it took to reboot the data port and then observes the status of the application component indicated by control line 293. When the application component confirms that it is in status "on", the time is recorded to compute the reboot duration. The SDC system then computes a suitable transmission delay for the respective data port of the data forwarding device and includes corresponding information in the configuration profile. The SDC system will transmit a configuration profile to the data forwarding device for storage in the configuration cache. This configuration profile contains (a set of) command(s) for each data port to be configured and information to configure the determined transmission delay.

In a preferred embodiment the configuration profile may contain information for each data port on the data forwarding device requiring a configuration. Alternatively, the configuration profile may be transmitted per data port on the data forwarding device.

In a preferred embodiment a data forwarding device may be provided with an optional power metering means on the data port. In this embodiment the status of the power metering means can be observed until it is stable. The time between the start of the reboot and the stable condition of the data port is recorded by the SDC system. Based on that data, the SDC system computes a suitable transmission delay for the configuration profile and includes this information in the configuration profile for the data forwarding device. The configuration profile and/or update information may be provided, for instance, via control line 292 shown.

If the data forwarding device has uses an internal power metering means to observe the reboot delay, the data forwarding device can alternatively use this information to internally set the transmission delay. This capability must be reported to the SDC system 200 to prevent fratricide.

Alternatively, the reboot time may be communicated to the SDC system 200, processed and remotely configured as part of the configuration profile.

The SDC system can select and control any data port in the network topology, be it a data port on data forwarding device functioning as a border network component connected to an end node or a data port connected to another data forwarding device somewhere along the network path in between end nodes. The SDC system can then decide for each data port, if to prepare a configuration profile. If the decision is positive respective configuration profiles will be sent to the respective data forwarding device 110 via control line 296 in FIG. 3 or via control lines 291, 292 to configuration cache module 150 in respective data forwarding devices 110 and/or 180 in FIG. 4.

Figure 4:
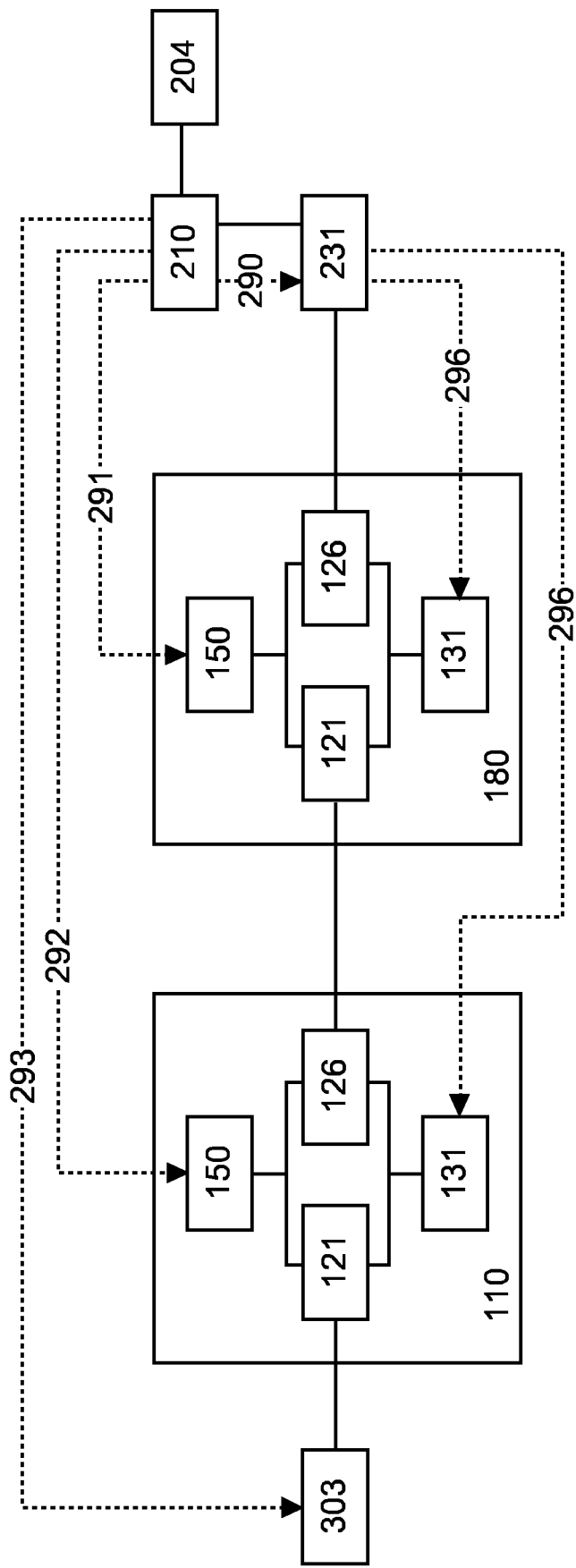
FIG. 4 shows control lines from an SDC system to a managed application control component or data forwarding device.

In a preferred embodiment, the control lines 291, 292 or 293 as shown in FIG. 4 may be implemented as a protocol with a restful interface requiring information updates to be initiated by the SDC system or alternatively by other components within the system taking the initiative to report data to the SDC system by themselves.

Figure 5A:
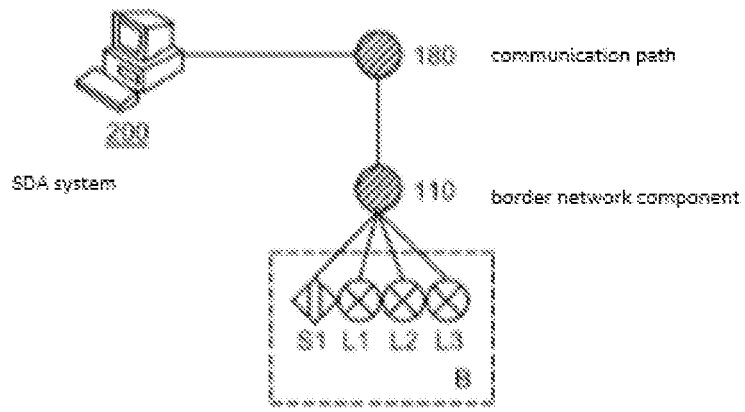
FIG. 5 illustrates a local trigger event according to a preferred embodiment of the present invention.
Figure 5B:
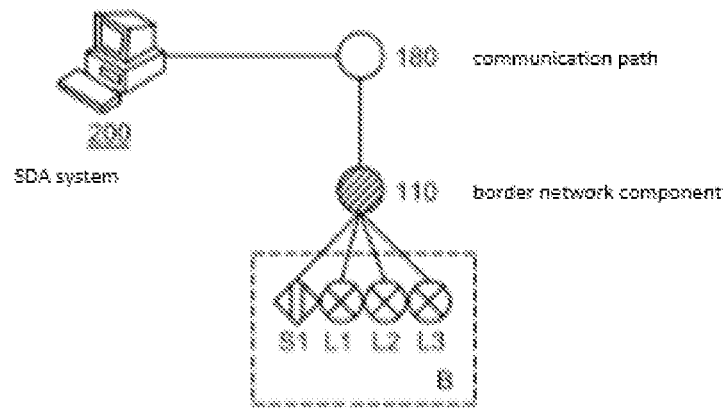

In a preferred embodiment, when the configuration cache is preloaded and configured with configuration commands, a trigger event may be used to start executing the transmission of the configuration commands from the configuration cache. An example is a trigger event from a sensor that is attached to the same data forwarding device as an application control component, e.g. a lighting actuator as exemplarily shown in FIG. 5*a*, that collaborates with the sensor according to a lighting application scene. Sensor S1 is supposed to interact with actuators L1, L2 and L3. When the sensor S1 detects a respective signal and is triggered, the actuators L1, L2 and L3 shall be switched. In accordance with a preferred embodiment of the present invention, which is shown in FIG. 5*b*, the configuration caches for the data ports connected to L1, L2 and L3 of data forwarding device 110 a are supposed to have been preloaded with configuration commands. The data forwarding device 110 is further programmed to identify data from the data port connected to sensor S1 to be destined for the data ports to which L1, L2 and L3 are connected. This may be derived from previous traffic and corresponding self-learning routines or commanded by the SDC system. The SDC system 200 analyses the application plan for an application scene, finds that S1 interacts with L1, L2, L3 and programs an entry in the border network component 110 that data provided by S1 shall execute transmission of the configuration caches for L1, L2 an L3. Thereafter, once sensor S1 is triggered and generates data on the data port it is connected to, this local trigger event will execute the transmission of the preloaded commands from the configuration caches for the associated actuators in the respective application scene. As a result, the network path in between the data forwarding device 110 and the SDC system 200 may not be required anymore for subsequent execution of the application scene. Thus, one or more data forwarding devices 180 along the data path may be set to a low power mode.

Figure 6A:
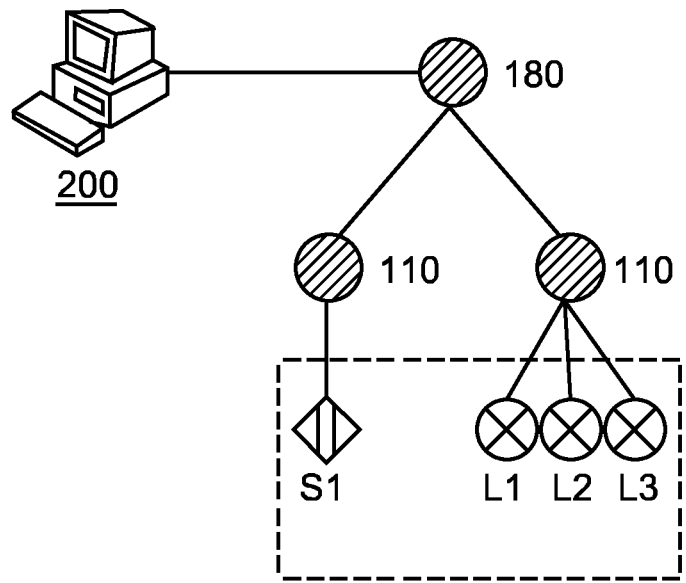
FIG. 6 illustrates a proxy trigger event according to a preferred embodiment of the present invention.
Figure 6B:
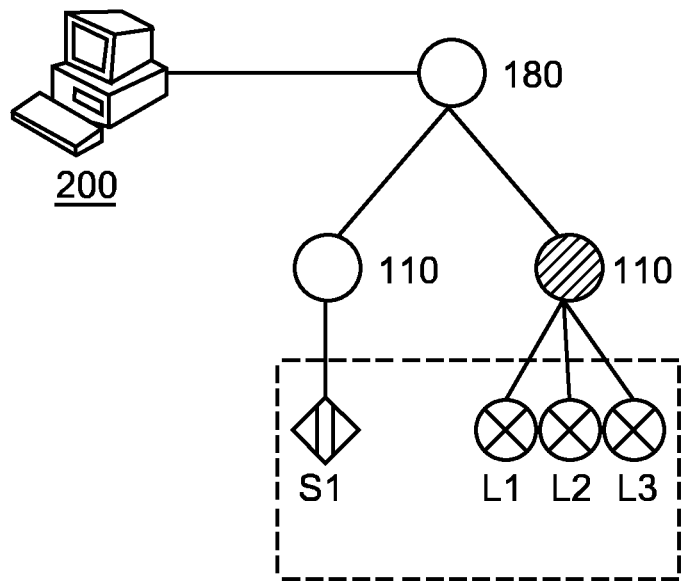

In another preferred embodiment, an application scene may associate sensors and actuators attached to different border network components 110 connected via one or more data forwarding devices 180 in between, as shown in FIG. 6*a*. To eliminate usage of said network path in between, e.g. data forwarding device 180, the SDC system 200 may determine a pattern for the trigger events from sensor S1 and program said pattern into an event proxy module of the respective border network components 110 to which associated actuators in the application scene are connected as depicted in FIG. 6*b*. The observed trigger events may be analyzed for, e.g.—but not limited to—repeatability, frequency or interval of trigger events. They may also be compared to known pattern typical for a respective application or already known from other data forwarding devices. If there is no pattern detected, the SDC system ignores the trigger events. Otherwise it derives a predictable pattern. It shall be appreciated that the filtering and analysis of the trigger events from sensor S1 shall preferably demonstrate repeatable behavior over time, since the intention is to substitute live events from S1 with a programmed event proxy in data forwarding device 110, such that S1 is not required (for a limited duration or permanently). Assuming that the SDC system derived a predictable pattern, the SDC system subsequently provides information to the data forwarding device 110 for simulating the execution of one or more trigger events from S1. Upon expiration of timer(s) associated with the predicted pattern of S1, the respective configuration commands from the respective configuration caches are transmitted to the connected actuators. As a result, of programming the event proxy module and also the configuration cache module the network path in between, e.g. data forwarding device 180, and the SDC system 200 may not be required anymore for subsequent execution of the application scene. The system may further enhance the responsiveness by observing the trigger events from S1, continuously or preferably periodically, to learn a delta between old and new patterns and optionally update the predictable pattern in the event proxy.

FIG. 7 shows an exemplary system diagram in accordance with a preferred embodiment of the present invention. A SDC system 200 comprises a network management system 230 and an SDA system 210 maintaining an application plan 204 with configuration profiles for end nodes 301, 302, 303, 305, 310 and 311. The end nodes may be different sensors and actuators powered via the data forwarding device or via optional external energy sources or storages 330. They are connected to a data forwarding device 102 via switchable data ports 121, 122, 124 and 125 or via a wireless bridge 103. Data forwarding device 102 is connected to SDC system 200 via switchable data port 126. In between SDC system 200 and data forwarding device 102 there may be one or more data forwarding devices 180 along the communication path. The SDC system determines, if a connected end node requires a configuration profile or not. The result may be different for respective data ports even for the same data forwarding device. As an example, assuming application control component 303 is a lamp powered over Ethernet, it is likely that a relative long transmission delay is required for actuator 303 of type X due to the relative long PoE reboot duration. This reboot may however be different compared to a reboot delay for lamp 305 of type Y or for actuator 302 of type B. If the configuration cache module 150 is implemented, the SDC system 200 transmits a configuration profile to the data forwarding device 102, which may be stored in the storage module 142, e.g non-volatile storage, and maintained in the memory module 141, e.g. volatile storage. The data forwarding device implements a data structure to contain the configuration profiles with clear association to the respective data ports, for instance by a cyclic buffer with the information for all data ports in there or a separate data structure per data. The data port management module 131 may disconnect data and or optionally power from the respective data ports 121, 122, 124, 125 and 126. When data and/or power is re-established, the configuration cache module 150 will transmit the configuration commands to the respective data ports after the respective transmission delays expired. The event proxy module 160 is remotely programmed by the SDC system 200 and implements the timer(s) to execute transmission of the associated configuration cache(s). The data port management module 131, the configuration cache module 150 and the event proxy module 160 may be software modules that run on a microprocessor 140 with memory 141 and storage 142 modules.

Procedures like determining a configuration profile, monitoring reboot times, determining transmission delay times, et cetera performed by one or several units or devices can be performed by any other number of units or devices. These procedures and/or the control of the application control system in accordance with the method for controlling application control components can be implemented as program code means of a computer program and/or as dedicated hardware.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. Data forwarding device for controlling a network component within an application control network, the data forwarding device comprising:
a data port of the data forwarding device coupled to the network component;
   a processor configured to determine if a configuration profile is required based on at least portions of an application plan and interactions between application components, the processor further configured to determine the configuration profile, wherein the configuration profile is set up using the application plan information comprising one or more application scenes, the one or more application scenes defining operation schedules and interaction information of application components within the application control network;
   a memory for storing the configuration profile comprising configuration commands for the network component;
   wherein the processor is further configured to transmit the configuration profile to the network component after the network component has been rebooted.

2. The data forwarding device according to claim 1, further comprising a power meter to measure a power status of the data port the network component is connected to, after a reboot of the network component has been initiated, wherein the processor is configured to transmit the configuration profile to the network component when the measured power status of the data port is stable.

3. The data forwarding device according to claim 2, wherein the processor is further configured to determine a reboot time of the network component based on the time measured until the power status of the data port is stable after a reboot of the network component has been initiated.

4. The data forwarding device according to claim 3, wherein the processor configured to transmit the configuration profile after a reboot of the network component has been initiated and the reboot time expired.

5. The data forwarding device according to claim 1, wherein the processor is triggered to transmit the configuration profile after the data forwarding device has received a signal from a second network component connected to another data port of the data forwarding device.

6. The data forwarding device according to claim 1, wherein the processor is further configured to simulate in accordance with a predetermined pattern a trigger event from a second network component connected to a data port of a second data forwarding device.

7. System for controlling application control components in an application control network comprising at least a first network component connected to a first data port of a first data forwarding device of the application control network, the system comprising:
   a processor configured to determine if a configuration profile is required based on at least portions of an application plan and interactions between application components, wherein the configuration profile is set up using the application plan information comprising one or more application scenes, the one or more application scenes defining operation schedules and interaction information of application components within the application control network, the processor further configured to determine the configuration profile comprising configuration commands and optional reboot time for the at least first network component; and
   after the first network component has been rebooted, a transmitter to transmit the configuration profile to a second network component, wherein at least one of the transmitter, first network component or second network component is along a network path between a data forwarding device of a first network device and a network control system providing the configuration profile, to the first network component for storage and for subsequent transmission to the first network component.

8. The system according to claim 7, wherein the at least first network component is an application control component
   (i) powered by an external power source or storage; or
   (ii) powered via the data port of the data forwarding device the application control component is attached to.

9. The system according to claim 7, wherein the at least first network component is a further data forwarding device within the application control network.

10. The system according to claim 7, wherein the processor is further configured to monitor a reboot time of the at least first network component and align a transmission time delay for transmitting the configuration profile from the second network component to the at least first network component (110, 180, 301, L1-L3) with the reboot time.

11. The system according to claim 7, wherein a third network component is connected to a second data port of the second network component and wherein the processor is further configured to determine
   (i) a second configuration profile for the third network component or
   (ii) a common configuration profile for the first and third network component.

12. The system according to claim 7, further comprising a control unit for instructing a data forwarding device along a communication path between the second network component and the control unit to power down for a predetermined time interval, after the configuration profile has been transmitted to the second network component communicatively close to the first network component.

13. Method for controlling application components in an application control network comprising at least a first network component connected to a first data port of a second network component of the application control network, the method characterized by determining if a configuration profile is required based on at least portions of an application plan and interactions between application components, wherein the configuration profile is set up using the application plan information comprising one or more application scenes, the one or more application scenes defining operation schedules and interaction information of application components within the application control network;

determining a configuration profile for the at least first network component comprising configuration commands and optional reboot time of the at least first network components, and wherein the configuration profile is set up in accordance with an application plan comprising one or more application scenes, the one or more application scenes defining operation schedules and interaction information of application components within the application control network; and after the first network component has been rebooted, transmitting the configuration profile to the second network component communicatively close, wherein the first or second network component is along a network path between a data forwarding device of a first network device and a network control system providing the configuration profile, to the first network component for storage and for subsequent transmission to the first network component.

14. The method according to claim 13, wherein determining a configuration profile comprises monitoring a reboot time of the at least first network component and aligning a transmission time delay for transmitting the configuration profile from the second network component to the at least first network component with the reboot time.

15. A computer readable non-transitory medium having stored therein instructions for causing processing unit to execute a method for controlling application components in an application control network comprising at least a first network component connected to a first data port of a second network component of the application control network, the computer program being executable in a processing unit, the medium comprising program code for causing the processing unit to carry out a method as defined in claim 13.

* * * * *